US008023517B2

(12) United States Patent
Yang et al.

(10) Patent No.: US 8,023,517 B2
(45) Date of Patent: Sep. 20, 2011

(54) SYSTEM AND METHOD FOR IMPROVING NETWORK PERFORMANCE AND SECURITY BY CONTROLLING TOPOLOGY INFORMATION

(75) Inventors: Yi Yang, Morrisville, NC (US); Donnie Van Savage, Raleigh, NC (US); Timothy M. Gage, Durham, NC (US); Thuan Van Tran, Cary, NC (US); James L. Ng, Mebane, NC (US)

(73) Assignee: Cisco Technology, Inc., San Jose, CA (US)

( * ) Notice: Subject to any disclaimer, the term of this patent is extended or adjusted under 35 U.S.C. 154(b) by 435 days.

(21) Appl. No.: 11/400,479

(22) Filed: Apr. 5, 2006

(65) Prior Publication Data

US 2007/0237095 A1 Oct. 11, 2007

(51) Int. Cl.
*H04L 12/28* (2006.01)
*H04L 12/56* (2006.01)

(52) U.S. Cl. ........ 370/401; 370/351; 370/352; 370/355; 370/389; 370/392; 370/393; 370/400

(58) Field of Classification Search .................. 370/351, 370/352, 355, 389, 390, 392, 393, 400–402
See application file for complete search history.

(56) References Cited

U.S. PATENT DOCUMENTS 6,385,649 B1 * 5/2002 Draves et al. ................. 709/224
6,463,061 B1 * 10/2002 Rekhter et al. ............... 370/392
6,850,492 B2   2/2005 Chander et al.
7,292,535 B2 * 11/2007 Folkes et al. ................. 370/238
2001/0005358 A1 *  6/2001 Shiozawa ..................... 370/228
2003/0137974 A1 *  7/2003 Kwan et al. .................. 370/352
2005/0259672 A1 * 11/2005 Eduri ............................ 370/412
2006/0034171 A1 *  2/2006 Rajsic et al. ................. 370/235
2006/0056411 A1 *  3/2006 Badat et al. ................... 370/392
2008/0123679 A1 *  5/2008 Scott et al. .................... 370/422

OTHER PUBLICATIONS

G. Malkin, "Network Working Group: RIP Version 2", Aquired at: http://www.faqs.org/ftp/rfc/pdf/rfc2453.txt.pdf, 39 pages, Nov. 1998.
C. Hedrick, "Network Working Group: Routing Information Protocol", Acuired at: http://www.faqs.org/ftp/rfc/pdf/rfc1058.txt.pdf, 33 pages, Jun. 1088.

* cited by examiner

*Primary Examiner* — Daniel J Ryman
*Assistant Examiner* — Jae Y Lee
(74) *Attorney, Agent, or Firm* — Fish & Richardson P.C.

(57) ABSTRACT

A system for optimizing the performance of a network. In an illustrative embodiment, the system includes a memory containing one or more data structures data structures. A first module determines transit-only information. A second module selectively omits the transit-only information from the one or more data structures. In a more specific embodiment, the one or more data structures include one or more tables. The transit-only information includes interface Internet Protocol (IP) addresses associated with network interfaces that are transit-only interfaces. The route information may include network topology information. The one or more tables may include a network topology table. Plural routers positioned in the network incorporate one or more instances of the system. The routers may employ one or more routing protocols, such as include Enhanced Interior Gateway Routing Protocol (EIGRP) or Routing Information Protocol (RIP).

17 Claims, 3 Drawing Sheets

SYSTEM AND METHOD FOR IMPROVING NETWORK PERFORMANCE AND SECURITY BY CONTROLLING TOPOLOGY INFORMATION

BACKGROUND OF THE INVENTION

This invention is related in general to networks and more specifically relates to digital networks and accompanying systems and methods for improving or optimizing network performance.

Digital networks are employed in various demanding applications including military, university, and business applications. Such applications often demand reliable high-performance networks that optimize-network resource usage.

Systems for improving or optimizing network performance are particularly important in large networks, which often have many routers connected in various configurations that can lead to network inefficiencies. An exemplary network may include plural routers that connect one or more computers or other network devices, including other routers, switches, and hubs. The routers may employ various routing protocols, such as distance-vector routing protocols, to facilitate delivering packets to destination addresses, such as Internet Protocol (IP) addresses.

A distance-vector routing protocol determines the best path for a packet to travel through a network to a destination address based on distance and vector metrics. A distance metric may incorporate numbers of router hops, link bandwidth, and so on, between IP addresses. A vector metric may incorporate information pertaining to the next router or IP address to which a given packet should be forwarded Examples of distance-vector routing protocols include Enhanced Interior Gateway Routing Protocol (EIGRP), Routing Information Protocol (RIP), Interior Gateway Routing Protocol (IGRP), and so on. Currently, EIGRP is emerging as a preferred routing protocol for many network applications. Routers that intercommunicate via EIGRP are often called EIGRP routers.

A network may include plural interfaces, which correspond to communication links between network devices, such as routers, switches, and computers. When routers initially connect to a network the routers establish initial communications with adjacent routers and exchange network topology information in a process called forming adjacency. The network topology information is maintained in topology tables, which are then employed to construct network routes between IP addresses. Network routes are listed in a routing table called a Routing Information Base (RIB).

An EIGRP topology table may contain neighboring router route advertisements, which may contain information pertaining to a particular route through the network to a given destination IP address. If a given route fails, then the router may refer to the topology table to obtain new route information pertaining to the destination IP address. The new routing information is provided to a routing table to facilitate routing data based on the new route information.

The topology table may contain additional information to build distance and vector information needed to reach certain IP addresses. The additional information may include minimum path bandwidth, total path delay, path reliability, delay, and so on. Topology tables are often further employed to perform neighbor-discovery and maintenance operations; to send route updates to neighboring routers when network topology changes; to determine which routes lack loops; to clear bad routes; to query neighbors; and so on.

Hence, a router topology table may be employed extensively during normal network operations. Unfortunately, conventional routers and accompanying systems often lack effective mechanisms for optimizing information in the topology table. Consequently, network performance is compromised.

DETAILED DESCRIPTION OF EMBODIMENTS OF THE INVENTION

A preferred embodiment of the present invention implements a system for enhancing the performance of a network with plural routers. The system includes a first mechanism for determining transit-only interfaces in the network. A second mechanism selectively omits information pertaining to the transit-only interfaces from one or more topology tables in the network.

In certain network topologies, some routers are connected only to other routers. These routers are called transit-only routers. Similarly, interfaces that connect only routers are called transit-only interfaces. Conventionally, information pertaining to transit-only interfaces is maintained in router topology tables.

For clarity, various well-known components, such as processors, power supplies, communication ports, hubs, modems, firewalls, network cards, Internet Service Providers (ISPs), and so on, have been omitted from the figures. However, those skilled in the art with access to the present teachings will know which components to implement and how to implement them to meet the needs of a given application.

Figure 1:
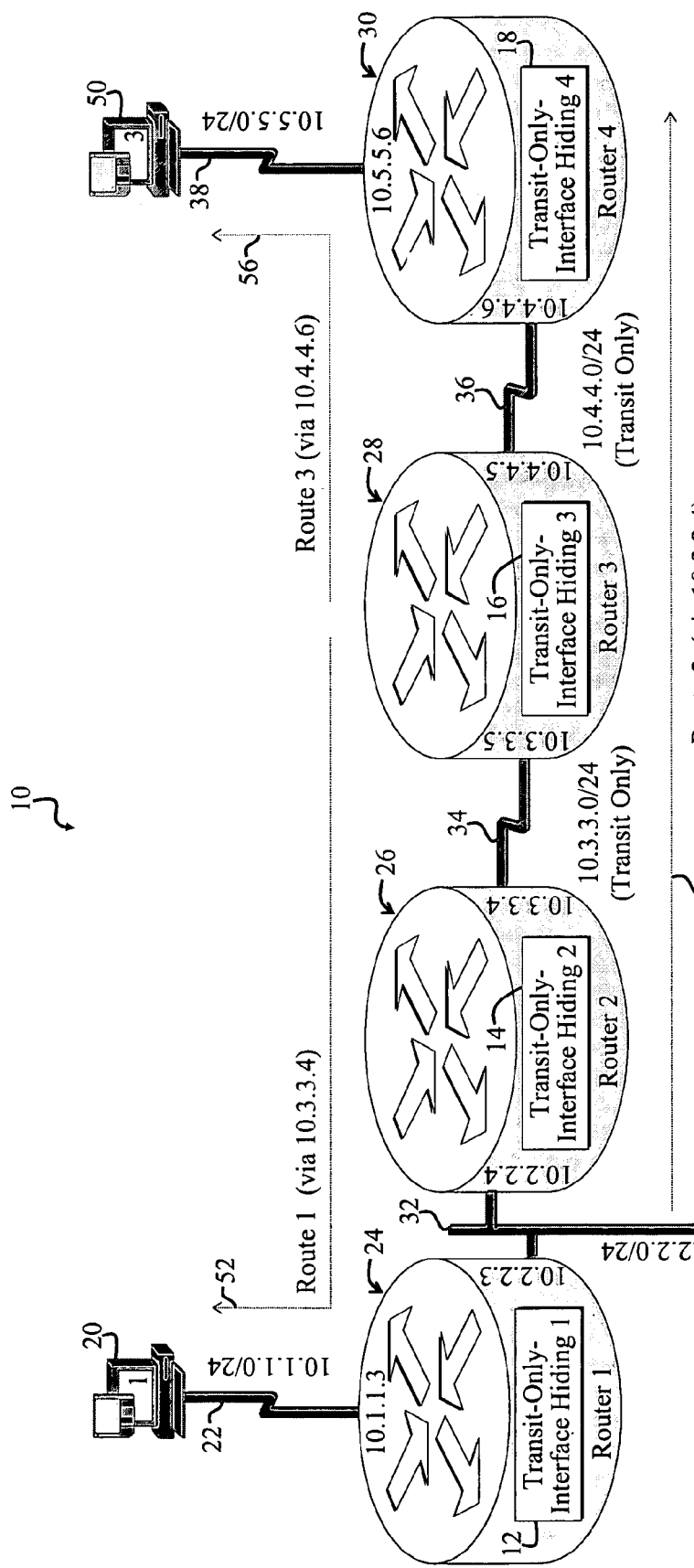
FIG. 1 is a diagram of an exemplary network employing a system for selectively hiding transit-only route information from a router topology table according to an embodiment of the present invention.

FIG. 1 is a diagram of an exemplary network 10 employing a system 12-18 for selectively hiding transit-only interface information from a router topology table according to an embodiment of the present invention.

The illustrative network 10 includes a first computer 20, which is connected to a first router 24 via a first interface 22. For illustrative purposes, the first interface 22 is associated with an Internet Protocol (IP) address of 10.1.1.0/24.

The first router 24, which includes a first transit-only-interface-hiding module 12, is further connected to a second router 26 via a second interface 32 that is characterized by an IP address of 10.2.2.0/24. A second computer 40 is also connected to the second interface 32.

The second router 26, which includes a second transit-only-interface-hiding module 14, is connected to a third router 28 via a third interface 34 that is characterized by an IP address of 10.3.3.0/24 for illustrative purposes. The third router 28, which includes a third transit-only-interface-hiding module 16, is connected to a fourth router 30 via a fourth interface 36 that is characterized by an IP address of 10.4.4.0/24. The third and fourth interfaces 34, 36 are called transit-only interfaces, since the interfaces connect only routers.

The fourth router 30 includes a fourth transit-only interface hiding module 18. The fourth router 30 is further connected to a third computer 50 via a fifth interface 38 that is characterized by an IP address of 10.5.5.0/24.

Each of the interfaces 22, 32-34 is associated with one or more additional IP addresses pertaining to router interfaces. For example, the first router 24 has a router interface, which is characterized by an IP address of 10.1.1.3, that points to the first interface 10.1.1.0 and the first computer 20. The first router 24 has a second router interface, which is characterized by an IP address of 10.2.2.3, that points to the second interface 32 and the second router 26. Similarly, the second router 26 has a router interface, which is characterized by an IP address of 10.2.2.4, that points to the second interface 32 and the first router 24. The second router 26 has a second interface 10.3.3.4 that points to the third interface 34 and the third router 28. Similarly, the third router 28 has a first interface 10.3.3.5 that points to the third interface 34 and the second router 26. The third router 28 further has a second interface 10.4.4.5 that points to the fourth interface 36 and the fourth router 30. Similarly, the fourth router 30 has a first interface 10.5.5.6 that points toward the fifth interface 38 and the second computer 50. The router 30 further includes a second interface 10.4.4.6 that points toward the fourth interface 36 and the third router 28.

For illustrative purposes, three routes 52-56 are shown, including a first route 52, a second route 54, and a third route 56. The first route 52 extends from the third router 28 to the first interface 22. The third router 28 is said to connect to the first interface 22 and the first computer 20 via 10.3.3.4, which represents the interface of the second router 26, which is called the next hop router, as seen by the third router 28.

Similarly, the second route 54 extends from the second interface 32 to the fifth interface 38. Devices, such as the second computer 40 and the first router 24 are said to connect to the fifth interface 38 via 10.2.2.4, which represents the interface of the second router 26, which is called the next hop router, as seen by the devices 24, 40 connected to the second interface 32.

Similarly, the third route 56 extends from the third router 28 to the fifth interface 38. The third router 28 connects to the fifth interface 38 via 10.2.2.6, which identifies the interface of the fourth router 30 as the next hop router employed to reach the fifth interface 38.

In operation, when the routers 24-30 are initially connected to the network 10, they-form adjacency relationships via use of hello packets and related mechanisms. In the present specific embodiment, the transit-only-interface-hiding modules 12-18 prevent information, such as IP addresses, pertaining to transit-only interfaces 34, 36 from entering topology tables, routing tables, and/or other tables or memory structures used for routing data between the computers 20, 40, 50. In Enhanced Interior Gateway Routing Protocol (EIGRP) routers, this significantly reduces topology-table and route-table size, thereby greatly improving network performance. The EIGRP routers 24-30 do not require the transit-only information to route packets via transit-only interfaces 34, 36, since the routes 52, 54, 56 are adequately identified by interface addresses (10.3.3.4, 10.2.2.4, 10.4.4.6) associated with the next hop routers 26, 30 to enable packets to successfully be routed between the computers 20, 40, 50.

For the purposes of the present discussion, an EIGRP interface may be an interface between routers that employ EIGRP to communicate via the interface. Similarly, a distance-vector-protocol interface may be an interface between routers that employs a distance-vector protocol to communicate via the interface. A router is said to be an EIGRP router if the router employs EIGRP to communicate between other routers.

Larger topology tables require more memory, updates, and queries, which slow router convergence times and increase the likelihood of undesirable Stuck-In-Action (SIA) conditions. Network convergence times increase with the number of IP addresses in a topology table or route table. Furthermore, malicious attackers can more easily launch remote attacks against routers by sending packets to transit-only interfaces if these interfaces are present in Routing Information Bases (RIBs) or routing tables. Consequently, employing the transit-only-interface-hiding modules 12-18 and accompanying mechanisms for controlling information in topology tables and route tables, may improve both network security and performance as discussed more fully below.

For the purposes of the present discussion, transit-only information may be any information that characterizes a transit-only interface, such as one of the transit-only interfaces 34, 36. Transit-only interface information may include IP-address information, interface tags, and so on.

A topology table is said to lack transit-only information if the topology table lacks at least some transit-only information that conventionally occurs in a topology table, route table, or related table used primarily for routing network packets. Depending on the application, topology table that lacks transit-only information does not necessarily lack all transit-only information.

For the purposes of the present discussion, network topology information may be any data pertaining to the structure of a network, such as available routes, IP addresses associated with routes, information specifying connections between routers and devices, and so on. Information occurring in a topology table is considered to be topology information.

A distance-vector protocol may be any protocol employed by a router to route a packet based on path characteristics and one or more IP addresses. A memory structure may be any mechanism for holding or maintaining information, including hardware and/or software mechanisms, such as tables, topology trees, and so on. Route information may be any data that facilitates routing a packet in a network based on an address associated with the packet.

The following table (Table 1) illustrates exemplary contents of a topology table employed by the first router 24 when the transit-only-interface-hiding modules 12-18 are disabled.

TABLE 1

EIGRP Topology Table for the First Router 24 (Router 1) when Transit-only-interface-hiding Modules 12-18 are Disabled:

| Interface: | Topology Information: |
|---|---|
| 38 | P 10.5.5.0/24, 1 successors, Feasible Distance (FD) is 358400 via 10.2.2.4 (358400/332800), Ethernet1/0 |
| 36 (Transit Only) | P 10.4.4.0/24, 1 successors, Feasible Distance (FD) is 332800 via 10.2.2.4 (332800/307200), Ethernet1/0 |
| 34 (Transit Only) | P 10.3.3.0/24, 1 successors, Feasible Distance (FD) is 307200 via 10.2.2.4 (307200/281600), Ethernet1/0 |
| 32 | P 10.2.2.0/24, 1 successors, Feasible Distance (FD) is 281600 via Connected, Ethernet1/0 |
| 22 | P 10.1.1.0/24, 1 successors, Feasible Distance (FD) is 281600 via Connected, Ethernet0/0 |

The following table (Table 2) illustrates exemplary contents of a route table, also called a Routing Information Base (RIB), employed by the first router 24 when the transit-only-interface-hiding modules 12-18 are disabled.

TABLE 2

EIGRP Topology Table for the First Router 24 (Router 1) when
Transit-only-interface-hiding Modules 12-18 are Disabled:

| Interface: | Route Information: |
|---|---|
| 38 | D 10.5.5.0 [90/358400] via 10.2.2.4, 00:01:09, Ethernet1/0 |
| 36 (Transit Only) | D 10.4.4.0 [90/332800] via 10.2.2.4, 00:01:18, Ethernet1/0 |
| 34 (Transit Only) | D 10.3.3.0 [90/307200] via 10.2.2.4, 00:01:28, Ethernet1/0 |
| 32 | C 10.2.2.0 is directly connected, Ethernet1/0 |
| 22 | C 10.1.1.0 is directly connected, Ethernet0/0 |

Table 1 and Table 2 contain transit-only topology information, such as interface IP addresses, Feasible Distance (FD) metrics, route identifications, and so on, pertaining to the transit-only routes 34, 36. Hence, when the transit-only-interface-hiding modules 12-18 are disabled or are not installed in a router, transit-only information may appear in both topology and route tables, which may reduce network performance.

The following table (Table 3) illustrates exemplary contents of a topology table employed by the first router 24 when the transit-only-interface-hiding modules 12-18 are enabled.

TABLE 3

EIGRP Topology Table for the First Router 24 (Router 1) when
Transit-only-interface-hiding Modules 12-18 are Enabled:

| Interface: | Topology Information: |
|---|---|
| 38 | P 10.5.5.0/24, 1 successors, FD is 358400 via 10.2.2.4 (358400/332800), Ethernet1/0 |
| 32 | P 10.2.2.0/24, 1 successors, FD is 281600 via Connected, Ethernet1/0 |
| 22 | P 10.1.1.0/24, 1 successors, FD is 281600 via Connected, Ethernet0/0 |

The following table (Table 4) illustrates exemplary contents of a route table employed by the first router 24 when the transit-only-interface-hiding modules 12-18 are enabled.

TABLE 4

EIGRP Topology Table for the First Router 24 (Router 1) when
Transit-only-interface-hiding Modules 12-18 are Enabled:

| Interface: | Route Information: |
|---|---|
| 38 | D 10.5.5.0 [90/358400] via 10.2.2.4, 00:01:09, Ethernet1/0 |
| 32 | C 10.2.2.0 is directly connected, Ethernet1/0 |
| 22 | C 10.1.1.0 is directly connected, Ethernet0/0 |

Hence, Table 3 and Table 4 lack transit-only topology information, such as interface IP addresses, Feasible Distance (FD) metrics, route identifications, and so on, pertaining to the transit-only routes 34, 36. Consequently, when the transit-only-interface-hiding modules 12-18 are enabled, transit-only information is hidden or does not appear in topology and route tables, which may improve network performance.

As a further example, the following table (Table 5) illustrates exemplary contents of a topology table employed by the third router 28 when the transit-only-interface-hiding modules 12-18 are disabled.

TABLE 5

EIGRP Topology Table for the Third Router 28 (Router 3) when
Transit-only-interface-hiding Modules 12-18 are Disabled:

| Interface: | Topology Information: |
|---|---|
| 38 | P 10.5.5.0/24, 1 successors, FD is 307200 via 10.4.4.6 (307200/281600), Ethernet1/0 |
| 22 | P 10.1.1.0/24, 1 successors, FD is 332800 via 10.3.3.4 (332800/307200), Ethernet0/0 |
| 32 | P 10.2.2.0/24, 1 successors, FD is 307200 via 10.3.3.4 (307200/281600), Ethernet0/0 |
| 36 (Transit Only) | P 10.4.4.0/24, 1 successors, FD is 281600 via Connected, Ethernet 1/0 |
| 34 (Transit Only) | P 10.3.3.0/24, 1 successors, FD is 281600 via Connected, Ethernet0/0 |

The following table (Table 6) illustrates exemplary contents of an RIB employed by the third router 28 when the transit-only-interface-hiding modules 12-18 are disabled.

TABLE 6

EIGRP Topology Table for the First Router 28 (Router 3) when
Transit-only-interface-hiding Modules 12-18 are Disabled:

| Interface: | Route Information: |
|---|---|
| 38 | D 10.5.5.0 [90/307200] via 10.4.4.6, 00:06:09, Ethernet1/0 |
| 36 (Transit Only) | C 10.4.4.0 is directly connected, Ethernet1/0 |
| 34 (Transit Only) | C 10.3.3.0 is directly connected, Ethernet0/0 |
| 32 | D 10.2.2.0 [90/307200] via 10.3.3.4, 00:06:19, Ethernet0/0 |
| 22 | D 10.1.1.0 [90/332800] via 10.3.3.4, 00:06:19, Ethernet0/0 |

Table 5 and Table 6 contain transit-only topology information, such as interface IP addresses, Feasible Distance (FD) metrics, route identifications, and so on, pertaining to the transit-only routes 34, 36. Hence, when the transit-only-interface-hiding modules 12-18 are disabled or are not installed in a router, transit-only information may appear in both topology and RIB tables, which may reduce network performance.

The following table (Table 7) illustrates exemplary contents of a topology table employed by the third router 28 when the transit-only-interface-hiding modules 12-18 are enabled.

TABLE 7

EIGRP Topology Table for the Third Router 28 (Router 1) when
Transit-only-interface-hiding Modules 12-18 are Enabled:

| Interface: | Topology Information: |
|---|---|
| 38 | P 10.5.5.0/24, 1 successors, FD is 307200 via 10.4.4.6 (307200/281600), Ethernet1/0 |
| 22 | P 10.1.1.0/24, 1 successors, FD is 332800 via 10.3.3.4 (332800/307200), Ethernet0/0 |
| 32 | P 10.2.2.0/24, 1 successors, FD is 307200 via 10.3.3.4 (307200/281600), Ethernet0/0 |

Hence, when the transit-only-interface-hiding modules 12-18 are enabled, transit-only information is removed from the topology table (Table 7).

The following table (Table 8) illustrates exemplary contents of a RIB employed by the third router 28 when the transit-only-interface-hiding modules 12-18 are enabled.

TABLE 8

EIGRP Topology Table for the Third Router 28 (Router 3) when
Transit-only-interface-hiding Modules 12-18 are Enabled:

| Interface: | Route Information: |
|---|---|
| 38 | D 10.5.5.0 [90/307200] via 10.4.4.6, 00:06:09, Ethernet1/0 |
| 36 (Transit Only) | C 10.4.4.0 is directly connected, Ethernet1/0 |
| 34 (Transit Only) | C 10.3.3.0 is directly connected, Ethernet0/0 |
| 32 | D 10.2.2.0 [90/307200] via 10.3.3.4, 00:06:19, Ethernet0/0 |
| 22 | D 10.1.1.0 [90/332800] via 10.3.3.4, 00:06:19, Ethernet0/0 |

The RIB Table 8 represents a special case, wherein a RIB table contains route information pertaining to the transit-only interfaces 36-34 when the transit-only-interface-hiding modules 12-18 are enabled. The route information pertaining to the transit-only interfaces 34, 36 is omitted from the corresponding topology table (Table 7) but included in the RIB Table 8 in the special case wherein the transit-only interfaces 34, 36 are local to the router, i.e., the third router 28 in the present illustrative scenario.

The topology Tables 1-8 are illustrative. Topology tables may include additional information depending on a network topology and routing protocols employed by the routers 24-30. In a router running EIGRP, a topology table may be displayed via a switch console via a show ip eigrp topology command provided via a Command-Line Interface (CLI).

Conventionally, an EIGRP topology table contains information needed to build a set of distances and vectors to each reachable network. Additional information that may be included in a topology table includes lowest bandwidth on a path to the router's destination as reported by an upstream neighbor, total path delay; path reliability, path loading, minimum path Maximum Transmission Unit (MTU), Feasible Distance (FD) information corresponding to the best metric along a path to a destination network, reported distance route source, and so on.

While the embodiment of FIG. 1 is discussed with respect to an exemplary network topology with specific IP-address assignments to various routes and interfaces, the present invention is not limited thereto. For example, embodiments of the present invention may be used with networks with any number of interfaces, computers, routers, or other network devices.

Embodiments of the present invention are particularly useful in networks that have one or more transit-only interfaces. Furthermore, while the network 10 is shown connected to personal computers 20, 40, 50, other types of network devices, such as switches, mobile phones, and so on, in addition to or other than personal computers may be connected to a network without departing from the scope of the present invention.

Figure 2:
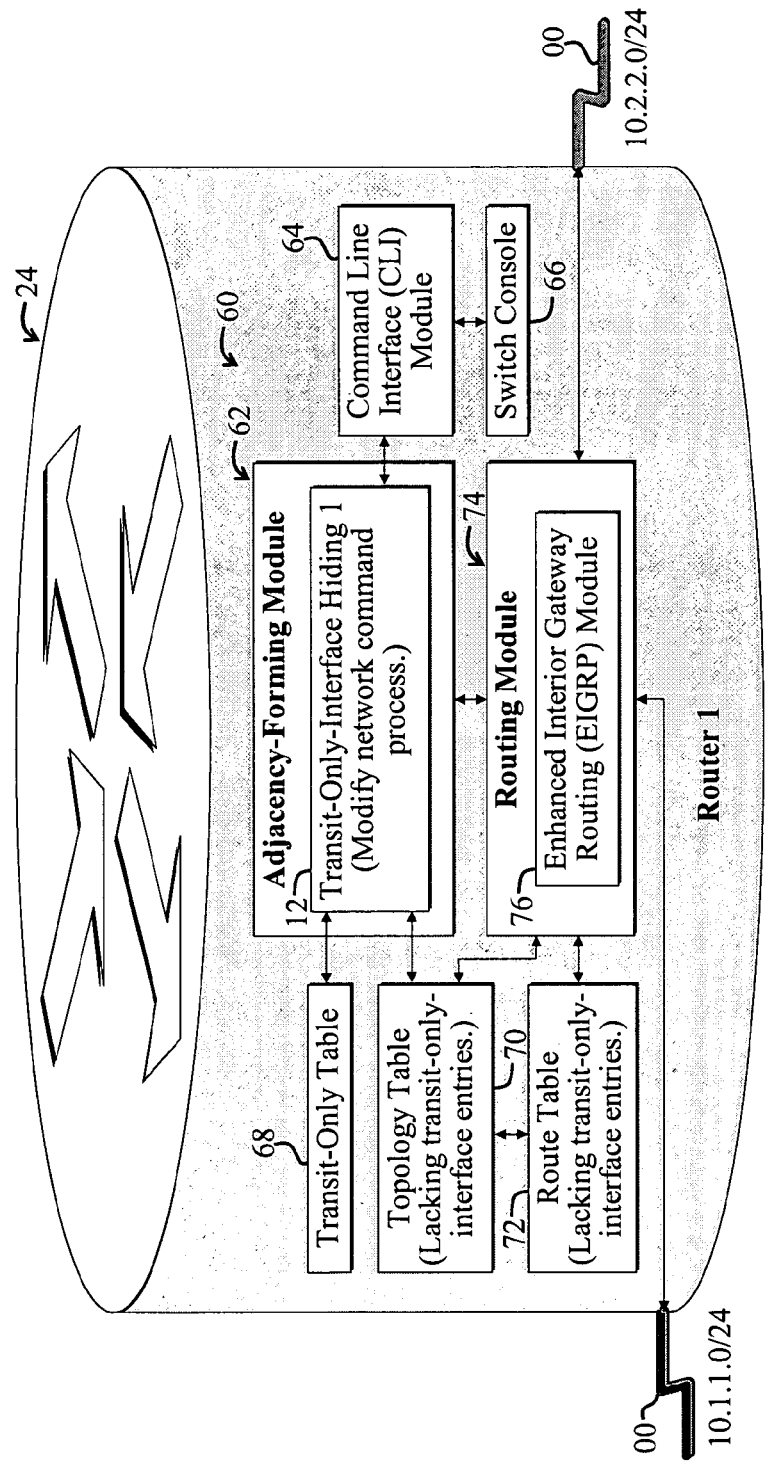
FIG. 2 is a more detailed diagram illustrating key functional modules of a router of FIG. 1 that are employed to selectively hide transit-only route information.

FIG. 2 is a more detailed diagram illustrating key functional modules 60 of the first router 24 of FIG. 1 that are employed to selectively hide or omit transit-only route information from a router topology table.

The key functional modules 60 represent a system for selectively hiding or omitting transit-only route information from a router topology table. In the present specific embodiment, the system 60 includes an adjacency-forming module 62, which includes the first transit-only-interface-hiding module 12.

The adjacency-forming module 62 is responsive to control signals from a Command-Line Interface (CLI) 64, which communicates with a switch console 66, which represents a user interface of the first switch 24. The adjacency-forming module 62 further communicates with a transit-only table 68, a topology table 70, and a routing module 74. The topology table 70 communicates with a route table 72 and the routing module 74. The route table 72 communicates with the routing module 74, which includes an EIGRP module 76 for facilitating implementing EIGRP.

While the various modules 60 of FIG. 2 are shown connected in various specific ways, embodiments of the present invention are not limited thereto. For example various modules may be combined into a single module, and certain modules, such as the transit-only table 68 may communicate with other modules, such as the routing module 74, without departing from the scope of the present invention.

In operation, the routing module 74 facilitates routing packets in a network based on network topology information contained in the topology table and route information contained in the route table 72. Information in the topology table 70 may be employed to build routes in the route table 72. The routing module 74 employs EIGRP 76 to facilitate communications between routers.

Upon initially connecting to a network, such as the network 10 of FIG. 1, the adjacency-forming module 62, which is adapted to work with EIGRP 76, facilitates determining the topology of a network, including which interfaces are transit-only interfaces. The transit-only-interface-hiding module 12 redirects transit-only information to the transit-only table 68, preventing the transit-only information, such as IP addresses associated with transit-only interfaces, from entering the topology table 70.

In one implementation, the transit-only-interface-hiding module 12 automatically redirects IP addresses associated with transit-only interfaces to the auxiliary transit-only table 68. Alternatively, the transit-only-interface-hiding module 12 implements one or more routines for selectively deleting transit-only information.

In certain applications, transit-only information may be employed to facilitate control signaling between routers. In these applications, the adjacency-forming module 62 may selectively access transit-only information in the transit-only table as needed 68. Those skilled in the art may implement embodiments of the present invention by modifying existing network-command processes without undue experimentation.

Alternatively, a user may employ the switch console 66 to manually control the adjacency-forming module 62 via one or commands issued to the adjacency-forming module 62 via the CLI 64. The switch console 66 and accompanying CLI functionality 64 may be employed to manually enter information pertaining to transit-only interfaces in a given network into the transit-only-interface-hiding module 12. Subsequently, the transit-only-interface-hiding module 12 will then omit the indicated transit-only information from the topology table 70.

Hence, users, such as network administrators, may designate interfaces that connect EIGRP routers exclusively as transit-only interfaces to facilitate implementing embodiments of the present invention.

In one implementation, the transit-only-interface-hiding module 12 is implemented in software and enables a user to employ the switch console 66 and accompanying CLI 64 to selectively disable or enable the transit-only-interface-hiding module 12. In the present specific embodiment, the transit-only-interface-hiding module 12 represents a modification to an EIGRP network-command process, wherein the modification causes EIGRP 76 to automatically insert an interface IP address into a topology table only if the interface is an EIGRP interface that is not a transit-only interface.

Conventionally, transit-only interfaces may distribute routable IPv4 addresses into EIGRP topology tables, which are then automatically exchanged between routers to support local control traffic despite whether or not the exchange is required for data traffic. By selectively omitting transit-only information, such as routable IPv4 addresses pertaining to transit-only interfaces from the topology table 70, certain embodiments of the present invention may reduce topology-table size, thereby improving network performance and network to attacks that are directed to the transit-only interfaces.

While the present embodiment is shown implemented via various modules, such as the transit-only-interface-hiding module 12, embodiments may be implemented via alterations to routing protocols, such as EIGRP routing protocols, without departing from the scope of the present invention. Those skilled in the art with access to the present teachings may readily modify EIGRP to facilitate hiding transit-only information from network topology tables without undue experimentation.

Hence, the system 10 may represent a system for enhancing the performance of a network, wherein the system 10 includes a first module 64, 74 adapted to determine transit-only interfaces in the network. A second module 12 is adapted to selectively omit information pertaining to the transit-only interfaces from one or more topology tables 70 and/or route tables 72 in the network.

The topology table 70 and the route table 72 represent memory structures that may be implemented via memory structures other than tables without departing from the scope of the present invention. The memory structures 70, 72 contain route information. The routing module 74 communicates with the memory structures 70, 72. The route information may include network topology information.

The system 60 may be considered to be a system for enhancing the performance of a network, wherein the system includes a first mechanism 64, 66, 74, 62 for determining information that can be omitted from a topology table to implement a certain task, such as routing packets between computers. A second mechanism 12 selectively omits the information from one or more topology tables 70, 72 in the network before performing the certain task.

With reference to FIGS. 1 and 2, each of the routers 24-30 may include instances of the system 60. The system 60 may employ other types of routing protocols other than EIGRP, such as various distance-vector routing protocols, including Routing Information Protocol (RIP).

Figure 3:
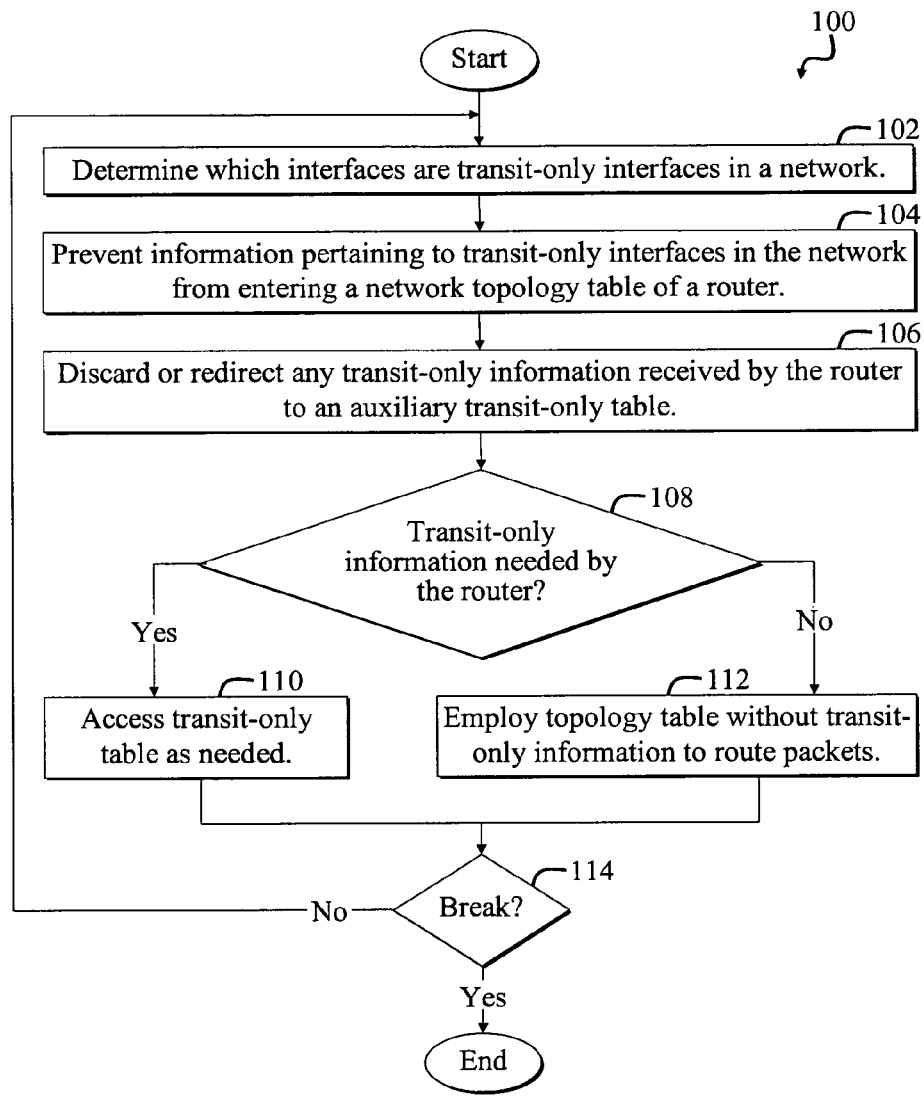
FIG. 3 is a flow diagram of a method adapted for use with the networks of FIG. 1.

FIG. 3 is a flow diagram of a method 100 that is adapted for use with the network 10 of FIG. 1. The method 100 includes an initial interface-determining step 102 wherein interfaces in a network that are transit-only interfaces are determined.

Subsequently, information pertaining to the transit-only interfaces, such as transit-only IP addresses, is prevented from entering a network topology table of a router.

In a subsequent redirecting step 106, the transit-only information received by a router is redirected to an auxiliary transit-only table, such as the transit-only table 68 of FIG. 2. Alternatively, the transit-only information is discarded if not needed for other purposes.

Next, an information-checking step 108 includes determining if transit-only information is required by one or more routers. If transit-only information is required, then the transit-only information is retrieved from the transit-only table 68 of FIG. 2 in a transit-only-accessing step 110. Otherwise, a routing step 112 is performed, wherein the topology table, such as the topology table 70 of FIG. 1, is employed by the associated router to route packets in the network.

Subsequently, a break-checking step 114 involves determining if a system break has occurred. A system break may occur when the system, such as the transit-only-interface-hiding module 12 of FIG. 2, is disabled; when a router is disconnected from a network; or when a router is turned off. If a system break has occurred, then the method 100 completes. Otherwise, the method continues at the interface-determining step 102.

Various steps 102-114 of the method 100 may be omitted, changed, or reordered without departing from the scope of the present invention. For example, the method 100 may be replaced with a more generalized method without departing from the scope of the present invention. An exemplary more generalized method involves determining transit-only interfaces in said network and then selectively omitting information pertaining to the transit-only interfaces from one or more topology tables in said network. The method may also be considered to be a method for preventing certain types of network attacks, such as Denial Of Service (DOS) attacks on transit-only network interfaces.

Although embodiments of the invention are discussed primarily with respect networks employing EIGRP routers, the invention is not limited thereto. Any router that employs a table or other memory structure to facilitate routing benefit from embodiments of the present invention that prevent information that is not required to route packets from being entered into tables or other data structures that are employed to route packets.

Although processes of the present invention and the hardware executing the processes may be characterized by language common to a discussion of the Internet (e.g., "client" or "peer"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs can be executing in a single machine, or in different machines.

Although the invention has been discussed with respect to specific embodiments thereof, these embodiments are merely illustrative, and not restrictive, of the invention. Embodiments of the present invention can operate between any two processes or entities including, devices, functional systems, or combinations of hardware and software.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
a first router that is connected to: (1) a core router, and (2) an edge router that is connected to the first router and another device, the core router being a router that is connected only to other routers:
a first module in the first router that:
identifies a transit-only interface that connect only routers;
sends an identification of the transit-only interface to a second module present in the first router; and
a second module in the first router that:
receives the identification of the transit-only interface from the first module present in the first router;
maintains, using the identification of the transit-only interface, a list of transit-only interfaces;
determines, from the list of the transit-only interfaces, which transit-only interfaces are local to the first router:
selectively omits transit-only route information pertaining to the transit-only interfaces from a topology table in the first router and also from a route table in the first router if the transit-only interfaces are not local to the first router; and writes the transit-only route information pertaining to the transit-only interfaces to a transit-only table, where the transit-only route information includes Internet Protocol (IP) addresses associated with the transit-only interfaces.

2. The system of claim 1 wherein the transit-only route information includes interface Internet Protocol (IP) addresses associated with network interfaces that are transit-only interfaces.

3. The system of claim 2 wherein the first module includes a command line interface (CLI) module.

4. The system of claim 3 further including routers, wherein the routers include one or more distance-vector routing protocols.

5. The system of claim 4 wherein the one or more distance-vector routing protocols include enhanced interior gateway routing protocol (EIGRP).

6. The system of claim 4 wherein the one or more distance-vector routing protocols include routing information protocol (RIP).

7. A method comprising:
identifying, on a first router, a transit-only interface that connects only routers;
maintaining, on the first router and using the identifications of the transit-only interface, a list of transit-only interfaces;
determining, from the list of the transit-only interfaces, which transit-only interfaces are local to the first router;
selectively omitting transit-only route information pertaining to the transit-only interfaces from a topology table in the first router and also from a route table in the first router if the transit-only interfaces are not local to the first router; and
writing the transit-only route information pertaining to the transit-only interfaces to a transit-only table where the transit-only route information includes Internet Protocol (IP) addresses associated with the transit-only interfaces.

8. A method comprising:
maintaining information on a first router that facilitates routing a network packet based on an address associated with the network packet;
routing a packet based on the information;
identifying, on the first router, a transit-only interface that connects only routers;
maintaining, on the first router and using the identification of the transit-only interface, a list of transit-only interfaces;
determining, from the list of the transit-only interfaces, which transit-only interfaces are local to the first router;
selectively omitting transit-only route information pertaining to the transit-only interfaces from a topology table in the first router and also from a route table in the first router if the transit-only interfaces are not local to the first router; and
writing the transit-only route information pertaining to the transit-only interfaces to a transit-only table where the transit-only route information includes Internet Protocol (IP) addresses associated with the transit-only interfaces.

9. The method of claim 8 wherein selectively omitting includes enabling a user to designate interfaces that connect routers exclusively as transit-only interfaces.

10. The method of claim 9 wherein selectively omitting further includes modifying a network-command process so that the network command process will automatically insert interface addresses in a topology table only if interfaces associated with the interface addresses are distance-vector-protocol interfaces and are not transit-only interfaces.

11. The method of claim 10 the distance-vector-protocol interfaces include one or more enhanced interior gateway routing protocol (EIGRP) interfaces.

12. A method comprising
identifying, on a first router, a transit-only interface that connects only routers;
maintaining, on the first router and using the identification of the transit-only interface, a list of transit-only interfaces;
determining, from the list of the transit-only interfaces, which transit-only interfaces are local to the first router;
selectively omitting transit-only route information pertaining to the transit-only interfaces from a topology table in the first router and also from a route table in the first router if the transit-only interfaces are not local to the first router;
writing the transit-only route information pertaining to the transit-only interfaces to a transit-only table where the transit-only route information includes Internet Protocol (IP) addresses associated with the transit-only interfaces;
determining whether the transit-only route information is needed; and
employing the transit-only route information in the transit-only table when the transit-only route information is needed by one or more routers.

13. The method of claim 12 further including employing the topology table without the transit-only information to route packets in the network.

14. A first router comprising:
a plurality of processors;
a computer-readable non-transitory medium including instructions executable by the plurality of processors for:
identifying, on a first module that includes at least one of the plurality of processors on the first router, a transit-only interface that connects only routers;
sending an identification of the transit-only interface to a second module that includes at least one of the plurality of processors present in the first router;
receiving, using the second module in the first router, the identification of the transit-only interface from the first module present in the first router;
maintaining, using the second module and the identification of the transit-only interface, a list of transit-only interfaces;
determining, using the second module, from the list of the transit-only interfaces, which transit-only interfaces are local to the first router;
selectively omitting, using the second module, transit-only route information pertaining to the transit-only interfaces from a topology table in the first router and also from a route table in the first router if the transit-only interfaces are not local to the first router;
writing, using the second module, the transit-only route information pertaining to the transit-only interfaces to a transit-only table, where the transit-only route information includes Internet Protocol (IP) addresses associated with the transit-only interfaces.

15. A first router comprising:
one or more processors;
a computer-readable non-transitory medium including instructions executable by the one or more processors for:
  identifying, on the first router, a transit-only interface that connects only routers;
  maintaining, on the first router and using the identification of the transit-only interface, a list of transit-only interfaces;
  determining, from the list of the transit-only interfaces, which transit-only interfaces are local to the first router;
  selectively omitting transit-only route information pertaining to the transit-only interfaces from a topology table in the first router and also from a route table in the first router if the transit-only interfaces are not local to the first router; and
  writing the transit-only route information pertaining to the transit-only interfaces to a transit-only table where the transit-only route information includes Internet Protocol (IP) addresses associated with the transit-only interfaces.

16. A first router comprising:
one or more processors;
a computer-readable non-transitory medium including instructions executable by the one or more processors for:
  maintaining information on the first router that facilitates routing a network packet based on an address associated with the network packet;
  routing a packet based on the information;
  identifying, on the first router, a transit-only interface that connects only routers;
  maintaining, on the first router and using the identification of the transit-only interface, a list of transit-only interfaces;
  determining, from the list of the transit-only interfaces, which transit-only interfaces are local to the first router;
  selectively omitting transit-only route information pertaining to the transit-only interfaces from a topology table in the first router and also from a route table in the first router if the transit-only interfaces are not local to the first router; and
  writing the transit-only route information pertaining to the transit-only interfaces to a transit-only table where the transit-only route information includes Internet Protocol (IP) addresses associated with the transit-only interfaces.

17. An apparatus comprising:
one or more processors;
a computer-readable non-transitory medium including instructions executable by the one or more processors for:
  identifying a transit-only interface that connects only routers;
  maintaining, using the identification of the transit-only interface, a list of transit-only interfaces;
  determining, from the list of the transit-only interfaces, which transit-only interfaces are local to the apparatus;
  selectively omitting route information pertaining to the transit-only interfaces from a topology table and also from a route table if the transit-only interfaces are local to the apparatus;
  writing the transit-only route information pertaining to the transit-only interfaces to a transit-only table where the transit-only route information includes Internet Protocol (IP) addresses associated with the transit-only interfaces;
  determining whether the transit-only route information is needed; and
  employing the transit-only route information in the transit-only table when the transit-only route information is needed by one or more routers.

* * * * *